United States Patent
Morris et al.

(10) Patent No.: US 11,709,647 B2
(45) Date of Patent: *Jul. 25, 2023

(54) REAL TIME COLLABORATION OVER MULTIPLE LOCATIONS

(71) Applicant: T1V, Inc., Charlotte, NC (US)

(72) Inventors: James E. Morris, Lake Wylie, SC (US); Michael R. Feldman, Charlotte, NC (US)

(73) Assignee: T1V, INC., Charlotte, NC (US)

( * ) Notice: Subject to any disclaimer, the term of this patent is extended or adjusted under 35 U.S.C. 154(b) by 21 days.

This patent is subject to a terminal disclaimer.

(21) Appl. No.: 17/384,951

(22) Filed: Jul. 26, 2021

(65) Prior Publication Data

US 2021/0373840 A1    Dec. 2, 2021

Related U.S. Application Data

(63) Continuation-in-part of application No. 16/431,433, filed on Jun. 4, 2019, now Pat. No. 11,347,467, which is a continuation-in-part of application No. PCT/US2017/064525, filed on Dec. 4, 2017.

(60) Provisional application No. 62/430,235, filed on Dec. 5, 2016.

(51) Int. Cl.
*G06F 3/048* (2013.01)
*G06F 3/14* (2006.01)
*H04L 67/10* (2022.01)
*H04L 65/401* (2022.01)

(52) U.S. Cl.
CPC ........ *G06F 3/1454* (2013.01); *H04L 65/4015* (2013.01); *H04L 67/10* (2013.01)

(58) Field of Classification Search
None
See application file for complete search history.

(56) References Cited

U.S. PATENT DOCUMENTS

| | | |
|---|---|---|
| 2013/0307920 A1 | 11/2013 | Cahill et al. |
| 2015/0095822 A1 | 4/2015 | Feis et al. |
| 2015/0350737 A1 | 12/2015 | Anderson et al. |

(Continued)

OTHER PUBLICATIONS

Extended European Search Report dated Aug. 13, 2021, in corresponding European Patent Application No. 17879181.0.

(Continued)

*Primary Examiner* — William C Trapanese
(74) *Attorney, Agent, or Firm* — Xsensus LLP

(57) ABSTRACT

Collaboration between a first computer associated with a first display at a first location and a second computer associated with a second display at a second location, includes establishing a connection between the first and second computers, starting a virtual canvas on the first computer, sending the virtual canvas from the first computer to the second computer, sending a file-based object between a host computer and a non-host computer so that the file-based object is located on the same location on the canvas for the first and second computers, streaming a live source object between a host computer running the live source object and a non-host computer by creating a live source window for the live source object within the virtual canvas on the host computer, sending the metadata information for the live source window to the non-host computer and streaming the live source object to the live source window.

20 Claims, 17 Drawing Sheets

(56) References Cited

U.S. PATENT DOCUMENTS

2016/0119388 A1     4/2016  Sitrick et al.
2016/0328114 A1*   11/2016  Santhakumar ...... H04L 12/1813
2017/0330150 A1    11/2017  Foley et al.
2019/0068661 A1*    2/2019  Masi .................... H04L 67/131

OTHER PUBLICATIONS

International Search Report and Written Opinion dated Feb. 2, 2018 for PCT/US2017/064525, Filed on Dec. 4, 2017, 6 pages.

* cited by examiner

REAL TIME COLLABORATION OVER MULTIPLE LOCATIONS

CROSS-REFERENCE TO RELATED APPLICATION

The present application is a Continuation-in-Part of U.S. application Ser. No. 16/431,433 filed on Jun. 4, 2019, which is a Continuation in Part of PCT/US2017/064525 filed on Dec. 4, 2017, which claims priority under 35 U.S.C. § 119(e) to U.S. Provisional Application No. 62/430,235, filed on Dec. 5, 2016; all of which are entitled: "Real Time Collaboration over Multiple Locations," and all of which is incorporated herein by reference in their entirety.

DESCRIPTION OF RELATED ART

There are currently different solutions to collaborating over multiple locations. Web-based conferencing mirrors an entire screen of a first computer to the screen of other computers. The web-based conferencing software allows any of the computers connected to be the "presenter." All of the other users connected can view the presenter's screen on their computer. However, there is the limitation that there is only one presenter who is mirroring their display at a time. The computer of the presenter sends the whole screen to the other computers at a refresh rate, i.e., streams the entire screen to a screen at another location.

Cloud based collaboration tools host a session on a cloud server and provide a link that client computers use to log in to the session on the cloud server. Multiple documents can be uploaded into the canvas on the cloud server and then viewed and/or downloaded by any client computers connected to the canvas. A "Session" for a canvas is defined as any time where one or more persons are viewing and editing a canvas. Each client computer in a session can then use an application and/or web application to edit a document or file in the canvas directly on the cloud server. While more than one client computer may edit the content of a canvas at a time, when something is being changed on a screen by a first client computer, the first client computer waits until the action is finished and then sends the information to the cloud server. When multiple client computers are connected to a canvas, they will periodically communicate with the cloud server to ensure that the canvas on each local computer matches that on the cloud server. A host session can open a canvas that is much larger than an individual screen. Each user at each location that joins the session can edit documents on the canvas.

For example, a user can perform a move or resize gesture on a window. After the gesture is complete, then the new size or location of the window is sent to the cloud server and the window is updated and sent to all locations. If an annotation, e.g., a line or circle, is drawn, once completed, i.e., a finger or stylus is lifted from the display, then this info is sent to the cloud server and the drawn image is stored on the canvas on the cloud server. Then, when each computer connected to the canvas receives updates from the cloud server, the annotation is added to the canvas (along with any other changes received by the cloud server since the last update) on each computer For example, if a user at one location has a powerpoint file that they would like to share, they first upload the powerpoint file to the cloud. Then all of the slides in the powerpoint file are converted to a useable file format (for example pdf format) and stored in the cloud. Then each computer connected to the canvas, when receiving an update, would receive a copy of the powerpoint document as the useable file (in pdf format in this example). As a pdf file, the power point presentation is then available for viewing from the other locations with the pdf viewer application, which is typically part of the canvas software. While everything is accessible in the cloud at any time in different time zones, e.g., asynchronous collaboration, when real time collaboration is desired, this may not be sufficient. Further, while these solutions may function well for many file types, live video feeds are not handled by this solution.

SUMMARY

A method of collaborating between a first computer associated with a first display at a first location and a second computer associated with a second display at a second location. The method includes establishing a connection between the first and second computers, starting a virtual canvas on the first computer and sending the virtual canvas from the first computer to the second computer. Either the first computer or the second computer may be a host computer for a file-based object on the canvas, sending the file-based object between a host computer and a non-host computer so that the file-based object is located on the same location on the canvas for the first and second computers. Either the first computer or the second computer may be a host computer for a live source on the virtual canvas, streaming a live source object between a host computer running the live source object and a non-host computer by creating a live source window for the live source object within the virtual canvas on the host computer, sending the metadata information for the live source window to the non-host computer so that the live source window is at the same location on the virtual canvas for the first and second computers, and streaming the live source object to the live source window from the host computer to the non-host computer.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Figure 1:
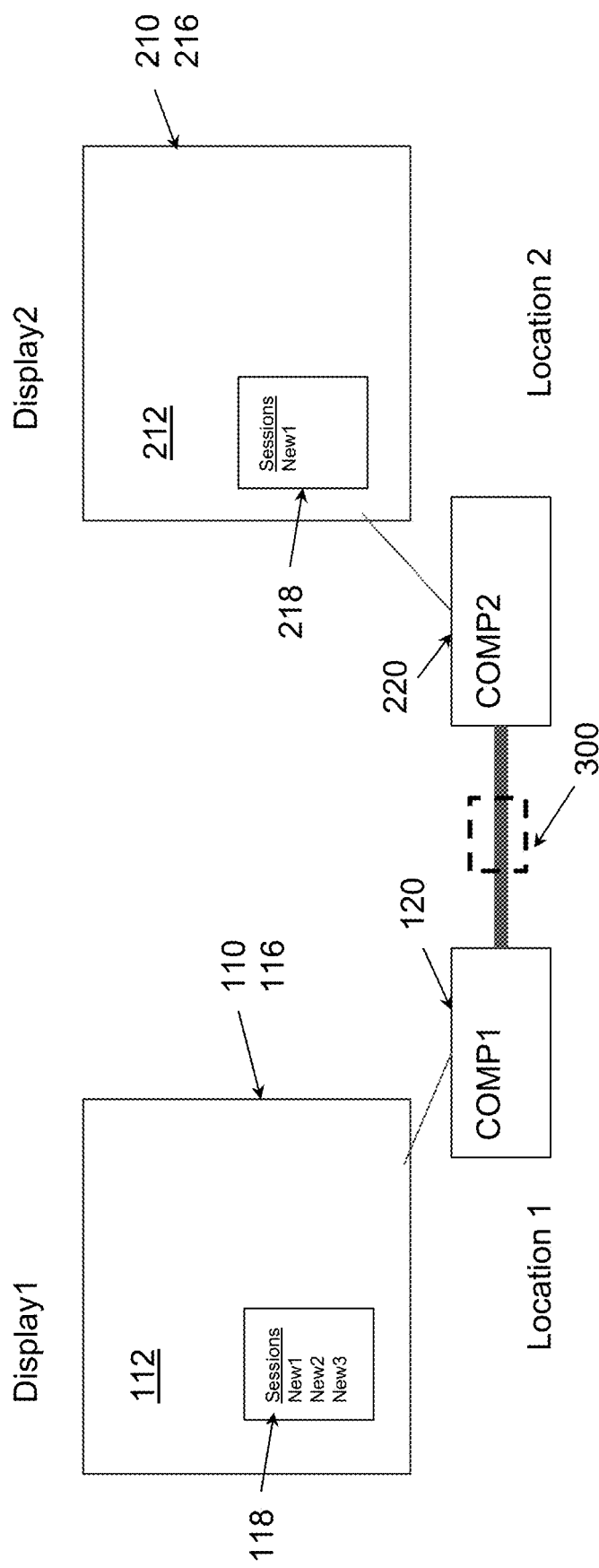
FIGS. 1 to 3, 4A, 4B, and 5 to 8 illustrate a display system in accordance with a first embodiment at different stages of operation.

As illustrated in FIG. 1, when operating at multiple locations, here illustrated as two for simplicity, when the screen on the displays is treated as a virtual canvas, rather than an entire screen, as disclosed, for example, in U.S. Pat. No. 9,596,319, issued on Mar. 14, 2017, which is hereby incorporated by reference for all purposes, individual objects or windows on the virtual canvas on a display Display1 110 at a first location Location 1 running on a first computer COMP1 120 may be transferred to a second computer COMP2 220 associated with a display Display2 210 at a second location Location 2 to be displayed on a virtual canvas on the display Display2 210, and vice versa. Instead of storing the objects or windows in the cloud, a shared canvas may be established to be accessed by both computers COMP1 120 and COMP2 220 running the displays using the virtual canvas software noted below and the objects can be transferred directly, e.g., using a peer-to-peer connection. This peer-to-peer connection may be established through a relay server, e.g., in the cloud, which does not store anything, but just relays that data or the connection may be direct peer-to-peer without going through a relay server.

As used herein, peer-to-peer connection means that the computers forming the peer-to-peer connection communicate with each other, either directly or through a relay server 300. When the relay server 300 is used, the relay server 300 just relays data in real time to facilitate the communication, but does not rely on storing data to transfer information. In contrast, in cloud-based communication protocol, each local computer communicates information to a cloud-based server. The cloud-based server has the master information or the master canvas and all objects on the canvas. Periodically, each local computer requests from the cloud server if any changes have been made to the master canvas and if so, a synchronization occurs between the local computer and the cloud server.

In accordance with embodiments, initially a virtual session is started at a first location, with a computer, e.g., Comp1 120 or Comp2 220, that is running virtual canvas software, i.e., a canvas APP, e.g., ThinkHub® multi-site software by TIV®. In particular, a virtual canvas that exists within the software that may be much larger than the physical display region 112, 212 on Display1 110, 210. Any section of the virtual canvas can be viewed on the display region 112, 212 of the Display1 110, 210. Suppose that at first the entire virtual canvas is viewed on the display region 112, 212 and that each of the displays 110, 210 include a touch or gesture sensor 116, 216 associated therewith. Then by zooming into regions, a portion of the virtual canvas can be viewed. By pinching, zooming and panning with gestures detected by the touch sensor 116, 216, a user can zoom into various regions of the virtual canvas to be shown on the display region 112, 212.

The virtual canvas is a virtual region that expands to greater than the physical area of the display regions 112, 212, e.g., any number of times the physical area up to infinite. The use of the virtual canvas allows additional files to be accessible and can be saved, but off the display regions 112, 212. Gestures, such as pan, zoom and pinch gestures can be made to move and resize the scale of the virtual canvas, allowing the full canvas to be displayed all at once or only a small section thereof.

Figure 2:
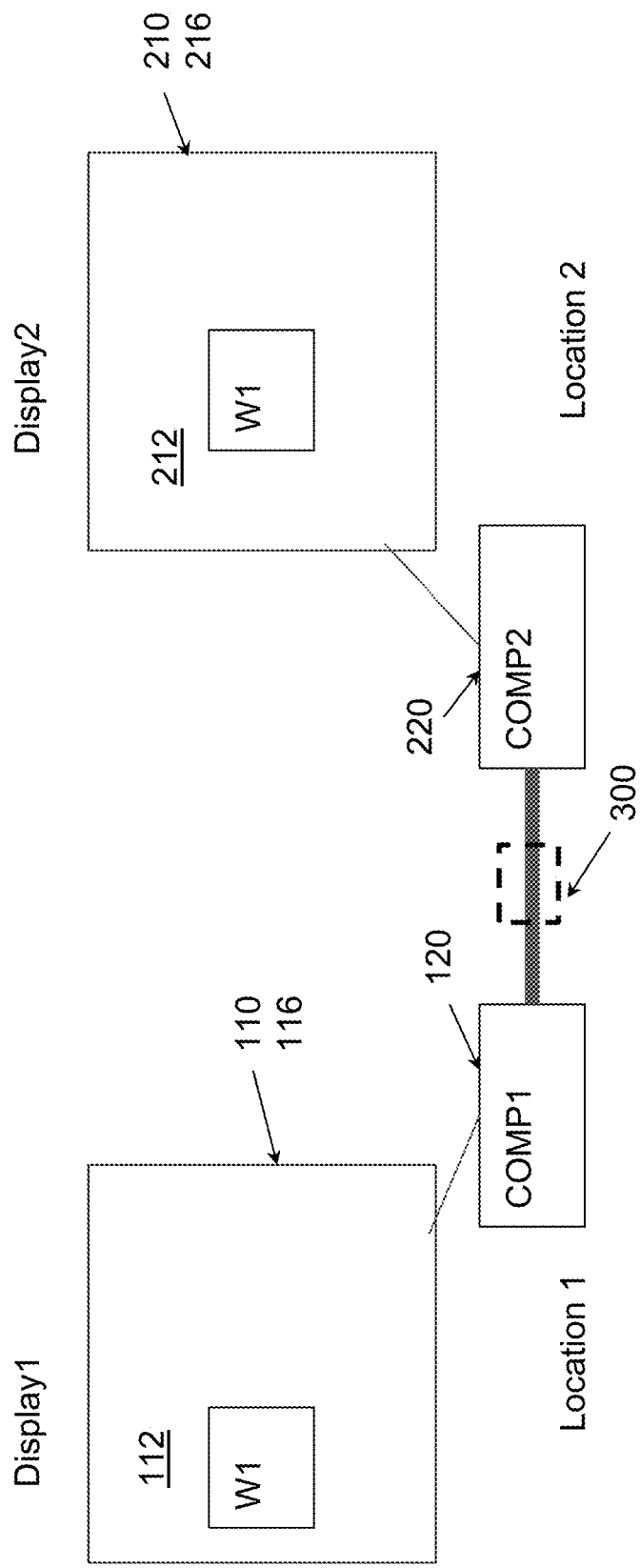
Figure 3:
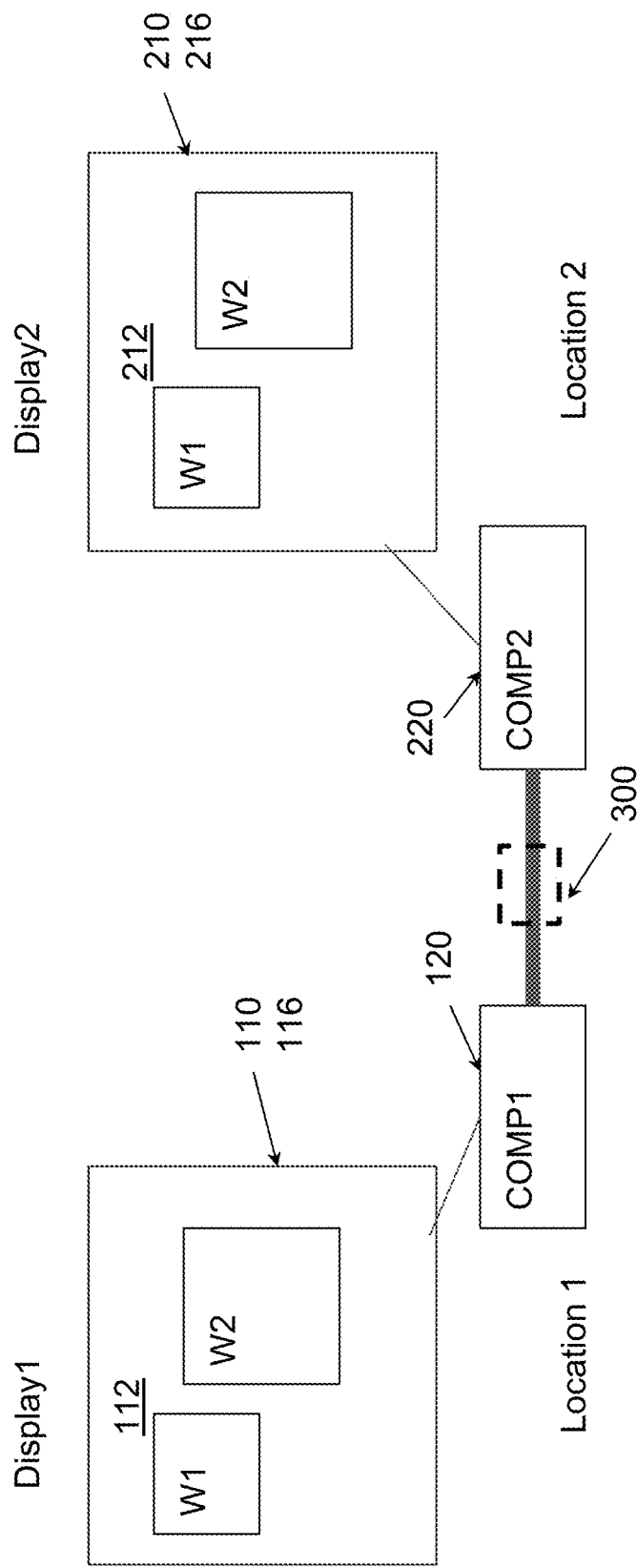

After connection is established, then a user, e.g., at Comp1 120 starts a multisite session and gives it a name, e.g., New1, as may be seen in a window 118 on Display1 110. Then, a user at a second location with a computer, e.g., Comp 2 220, that is also running the virtual canvas software can see a list of active multisite sessions that it has permission to access, e.g., New1 as shown in window 218 on Display2 210. Then, the user at the second location taps on a button or on the name in the list on the virtual canvas to join the session. Once the second computer joins the session, the connection is established between Comp1 and Comp2, and the data for all the objects on Comp1 in the virtual canvas is then sent to Comp 2, and vice versa, such that the virtual canvas is now a shared canvas. For example, as shown in FIG. 2, when a window W1 is opened in Display1 at Location 1, the window W1 will also appear in Display 2 at Location 2. Similarly, as shown in FIG. 3, when a window W2 is opened in Display2 at Location 2, the window W2 will also appear in Display 2 at Location 2. From this point forward, any time a user on either computer (Comp1 or Comp 2) enters any data onto the canvas or opens a new window, the entire data or window is transmitted to the other computer, so that at any time after the initial set-up all objects in either display are stored locally on both computers. Further, objects are at a single location on the shared canvas, and objects on the shared canvas can be manipulated from both the first and second display computers simultaneously. File-based objects can be displayed and edited by both sides simultaneously by exchanging all file-based data about the object with both sides and any changes are exchanged in real time. Examples of file-based objects are notes, images, sketches and pdf files. These can be accessed and manipulated with native apps built into the canvas software, for example a Note App, Sketch App, image viewer or pdf viewer. Live Source objects may change continuously and may be edited or changed outside of the canvas APP. For example, if the Canvas is closed and reopened later, the live source object may be different. What is stored on the Canvas is the metadata, e.g., the location of the live source object on the canvas and a pointer to the source of the live source object. For file-based objects, the entire file is saved on the canvas and the object information for that file can only be changed within the canvas App: a file-based object is changed on one computer within the canvas App and then updated on the virtual canvas stored in the cloud and then all computers that connect to the Canvas receive the updated file information.

Native objects are objects that are controlled within the application APP, e.g., a sketch, a note, objects, pdf viewer, image viewer, and so forth. While the above has shown the displays displaying the objects at the same locations on the two displays, this is true if the displays are both displaying the same views of the canvas. In other words, while the objects are at the same location on the canvas, different views of the canvas may be viewed on the different displays. For example, if Display 2 were viewing the same general region of the virtual canvas, but with a different zoom factor and slightly different center point, then on Display 2 W1 and W2 would appear on the same places on the virtual canvas but different locations on the Display and with different scale factors. Further, one display may be viewing a different portion of the shared canvas without altering the view on the other display. Alternatively, changing portions being viewed on one display may alter that view on the other display.

Any object that is not a native object to the canvas APP may be treated as a live source object to be streamed from the host computer to the non-host computer. For example, a web browser, a Microsoft® files, Apple® files, non-reader only versions of PDF documents, and so forth, when placed on the canvas as then streamed by the canvas APP to the non-host computer. Annotations, movement, resizing, and so forth on these live objects are native to the canvas APP and will be stored with the canvas. Additionally, the canvas APP may be configured to handle changing objects that are still a file, e.g., a video file, by fully storing the changing object on the canvas, partially storing the changing object on the canvas or may be streamed. Types of LSW include web browsers, video files, hardline inputs, screen shares, and so forth, as well as any applications being run that are not native to the canvas APP, e.g. SOLIDWORKS, AutoCAD®, Microsoft® Office non-web versions, and so forth File-based objects are typically native objects. For these objects, the entire file is typically stored in the canvas in the cloud and stored on each computer connected to the canvas while the canvas is opened on the computer. Live source objects are typically received from the live source by a computer (the host computer for the live source). The host computer may place the content for the live source in the window for the live source in the canvas on the display for the host computer. The host computer will also stream the live source to the other computers for viewing the canvas in the same session. The host computer may be a desktop computer, a mobile device or a cloud server. The host computer may stream the live source either directly or through a relay server.

Some file-based objects, e.g., video files, may be treated as live sources, in that they may be streamed, rather than sending the entire file to each computer. Streaming of the video files may help keep all of the videos in sync for all of the viewers. Another advantage of streaming a video file rather than sending the entire file, is that streaming may be faster and can be done in real time. If the video file is very large, it may take a long time to send the entire file. Another option is to send the video file (treat it as a file-based object) if it is below a predetermined size, and stream it (treat it as a LSW) if it is larger than or equal to the predetermined size.

Figure 4A:
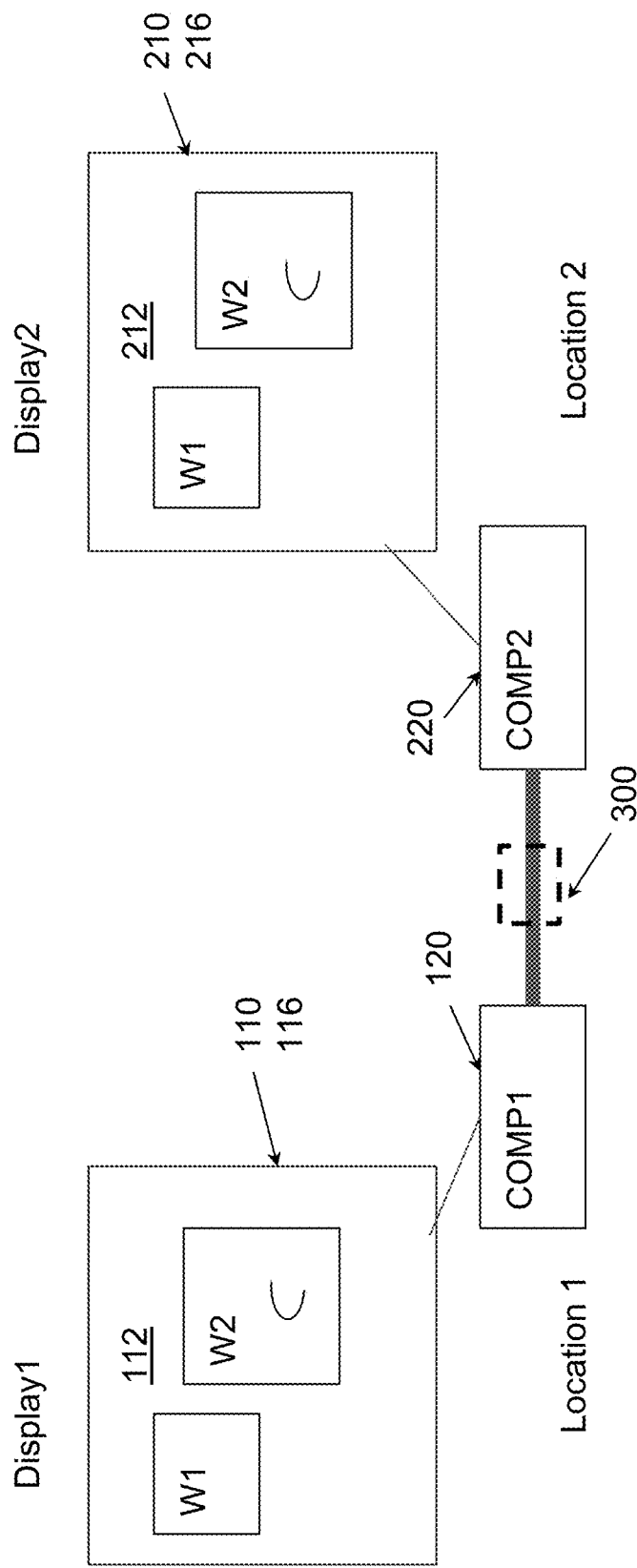
Figure 4B:
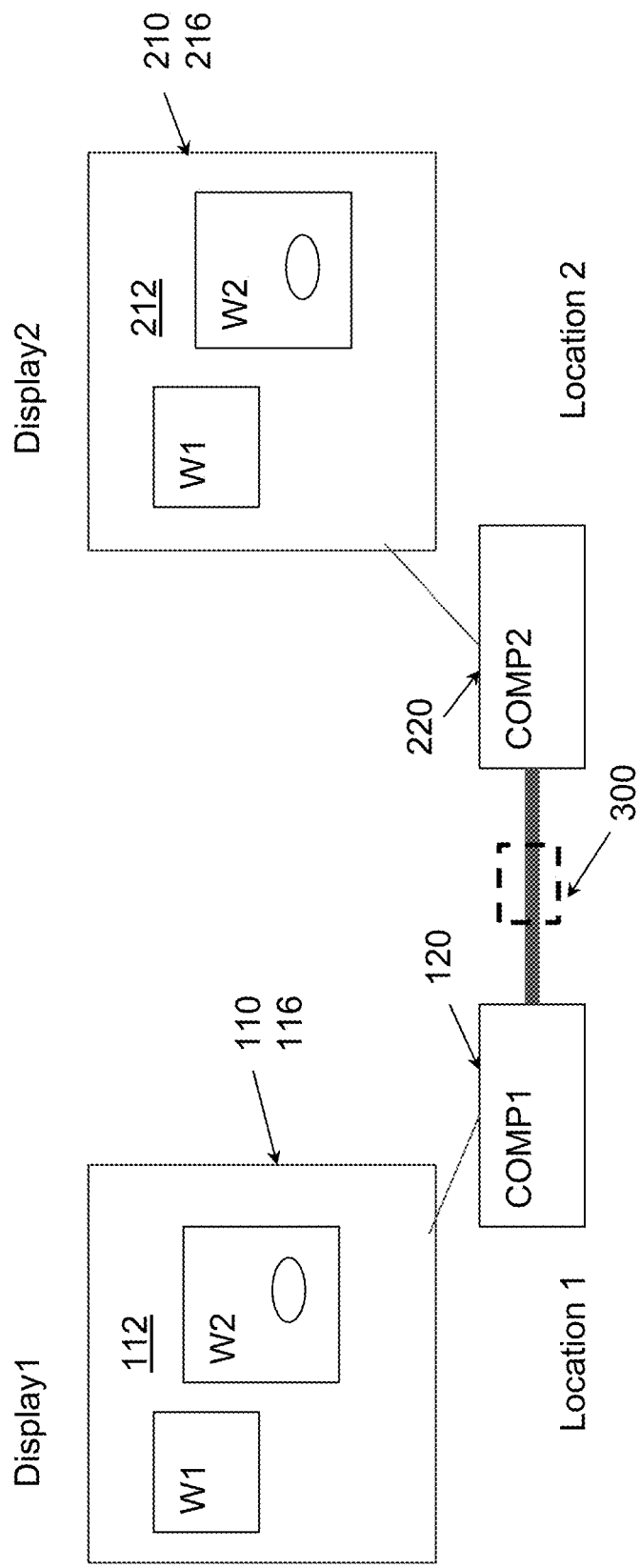

For file-based objects, when each file-based object is stored locally, when an action is performed on that object, e.g., annotation, resizing, moving, and so forth, only that data regarding the change would be sent from the computer associated with the display on which the change has been made to the other computer(s) viewing that object. This allows very fast performance once the object has been initially stored, as only the changed data is communicated. Further, this allows the change to be illustrated in real time, e.g., the remote display will show the zoom or pinch rather than abruptly change the size or will show the annotation as it is being drawn, rather than once a line or character is completed. For annotation on an object, the drawing data can be sent from one location to another as the object is drawn. For example, as illustrated in FIGS. 4A and 4B, if a user at one location annotates, e.g., draws an ellipse, in a window, e.g., the second window W2, the second window W2 will also show the annotation in FIG. 4A before the ellipse is completed, as shown in FIG. 4B. While annotations on either display will appear on the shared canvas, each display may independently view different portions of the shared canvas or portions being viewed by both displays may be synchronized to be the same.

In addition to sharing files, objects, live video streams or other data on computers at the first and second locations, data can also be shared from mobile devices. There are three methods by which data can be shared by mobile devices. In addition, while Comp1 and Comp2 are shown above as being in-room devices, COMP1 and COMP2 may also be mobile devices running the canvas APP, e.g., ThinkHub® multi-site software. There are three methods by which data can be shared by mobile devices to COMP1 and COMP2 or to any computer running the canvas APP which is not also running the canvas APP.

The first method includes sharing the contents of a display on a mobile device with Display 1, Display 2, or any display connected to a computer participating in a multi-site session ("Content Sharing"). When mobile device Content Sharing occurs, typically a sharing application is first downloaded to the mobile device (e.g. the T1V® AirConnect™ App, as set forth in U.S. patent application Ser. No. 15/184,814, filed on Jun. 16, 2016, and entitled "REMOTE GESTURE CONTROL, INPUT MONITOR, SYSTEMS INCLUDING THE SAME, AND ASSOCIATED METHODS", which is hereby incorporated by reference in its entirety for all purposes) or uses a sharing protocol built into the operating system (e.g., Airplay, Miracast, as set forth in U.S. application Ser. No. 15/056,787, filed Feb. 29, 2016, now U.S. Pat. No. 10,616, 633, and entitled "SYSTEM FOR CONNECTING A MOBILE DEVICE AND A COMMON DISPLAY", which is incorporated by reference herein for all purposes). The sharing application then digitizes the user's screen (the user of the mobile device) and transmits the digitized data to the Display Computer (e.g., Comp1) as a video stream. Then Comp1 then displays this video stream in a Live Video window on Display 1. This Live Video window is then shared by streaming this data to any other computers connected to the multi-site session.

The second method is for objects to be transmitted from a mobile device to a Display Computer (e.g., Comp1). Once a connection is established between a mobile device and a Display Computer (e.g., as in a U.S. patent application Ser. No. 15/207,841 filed Jul. 12, 2016 and entitled "DISPLAY CAPABLE OF OBJECT RECOGNITION", now U.S. Pat. No. 10,809,854, which is incorporated by reference herein for all purposes) and if the mobile device has a sharing application downloaded (e.g., the AirConnect™ App), then the sharing application can send a file for an object on the mobile device (e.g., a .pdf, a .jpg, a .ppt file) to the Display Computer. Alternatively, the mobile device can be connected by a hardline input. Once the Display Computer receives this file, it can display it as an object on the display and on the virtual canvas. This object would then be shared with any other computer connected to the Display Computer through a multi-site session, i.e., on the shared canvas.

The third method of interacting with a screen with a mobile device is to add additional capabilities to the sharing application downloaded onto the mobile device. For example, the sharing application could allow the user of the mobile device to view the canvas and use the inputs on the mobile device (e.g., via a mouse, a touchscreen, a touchpad, and so forth) to manipulate objects on the virtual canvas. If the sharing application is used in this manner, then when a user of a mobile device moves an object on the virtual canvas, then the object is moved on all of the computers in the multi-site session viewing that canvas simultaneously.

Figure 5:
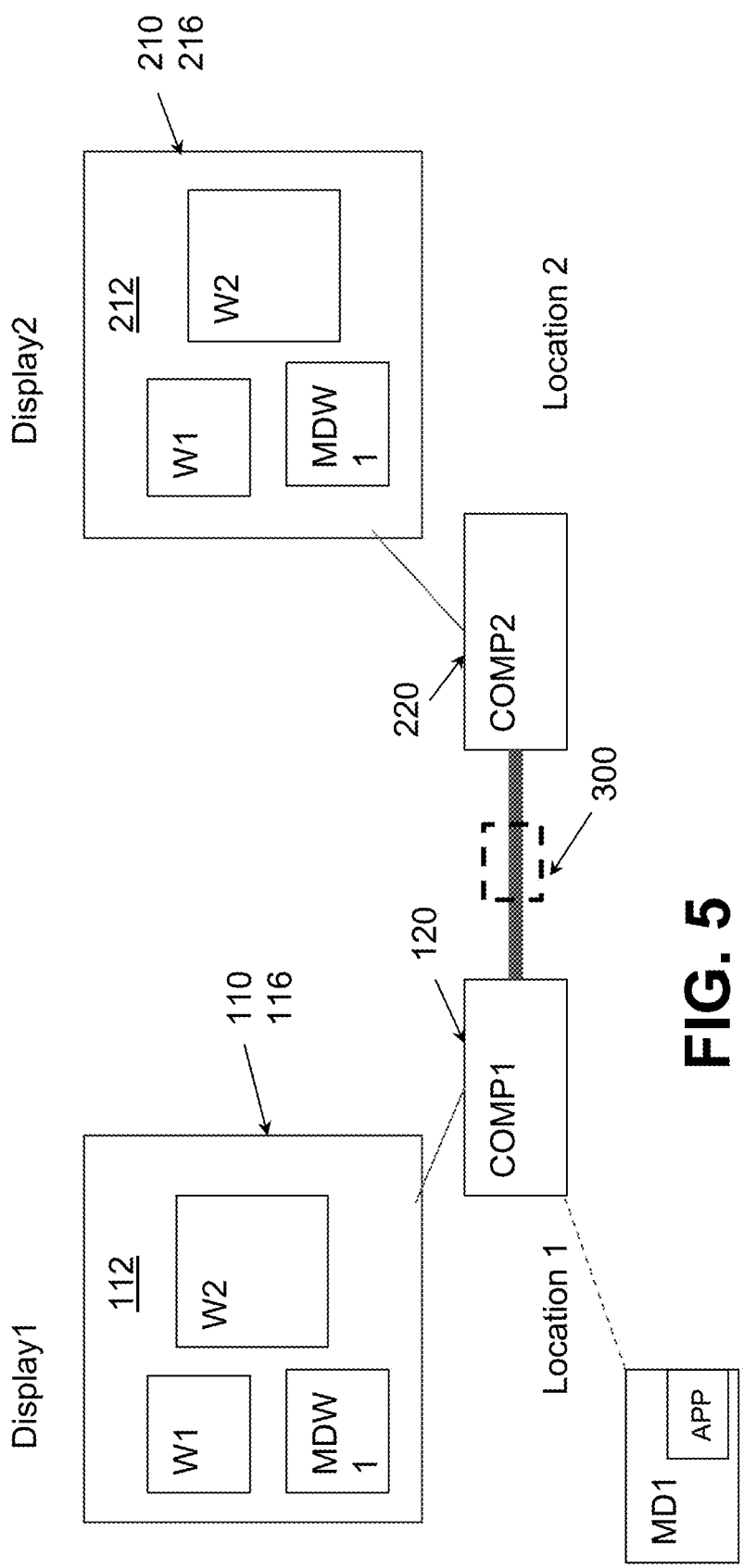

In all three of these methods, the mobile device MD first makes a connection to a single computer of all of the Display Computers in the multi-site session. This connection is typically made as discussed in any of the above referenced U.S. patent applications, through the use of a Key or IP address. Typically, if the user of the mobile device is in the same room as one of the Display Computers, they will see the key or IP address of that computer displayed on the Display and make the connection to that computer. It may then make a direct peer-to-peer connection to that computer, e.g., a wireless connection. However, the mobile device can make an initial connection to any of the computers in the multi-site session, depending on the Key or IP address entered. Once this initial peer-to-peer connection is made to one of the Display Computers, data can be shared from that computer to all other Display Computers in the multi-site session by the methods described above. When an object from the mobile device MD1 is displayed on the Display1 in a mobile device window MDW1, as shown in FIG. 5, the file is stored on Computer1 and in Computer2.

In another embodiment Computer1 and Computer2 are mobile devices. They both first download a sharing application as described above for the implementation with mobile devices. The sharing application, though, this case contains both the sharing application functions described previously as well as the virtual canvas software described above as can be run on Computer1 and Computer2.

Figure 6:
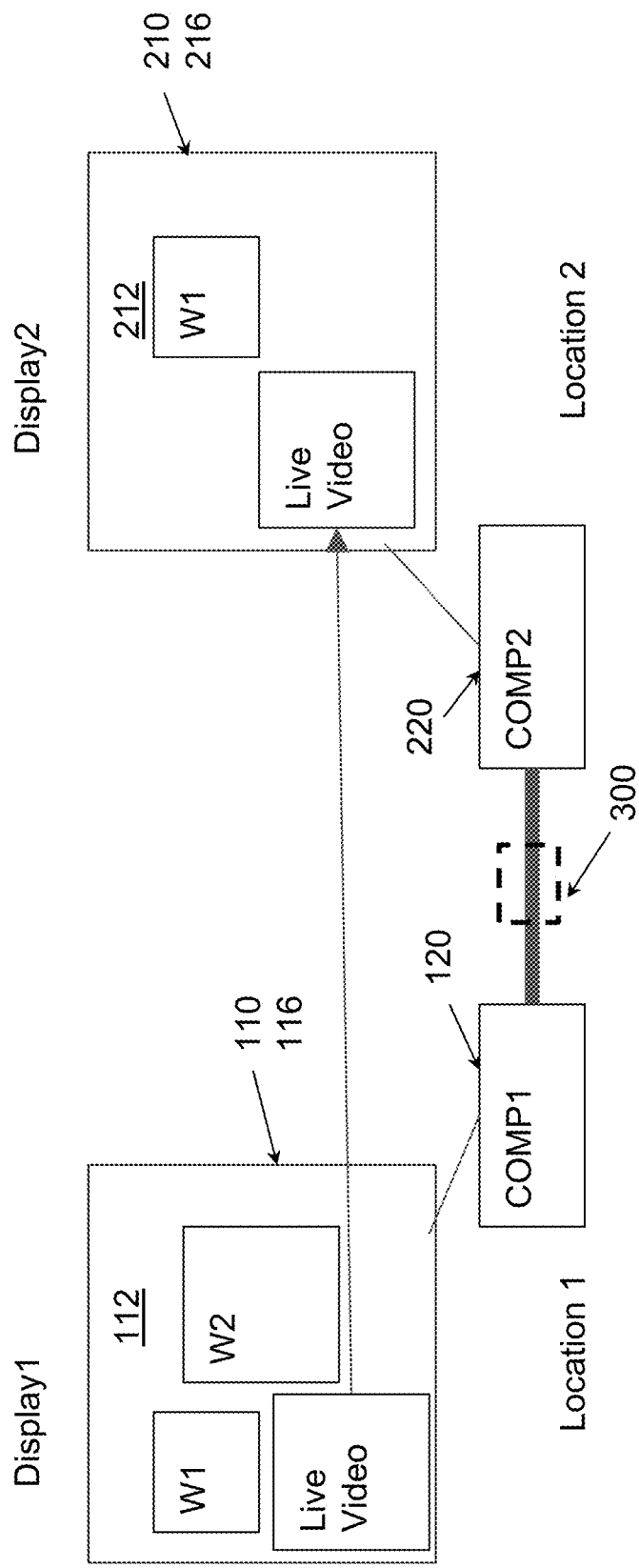
Figure 7:
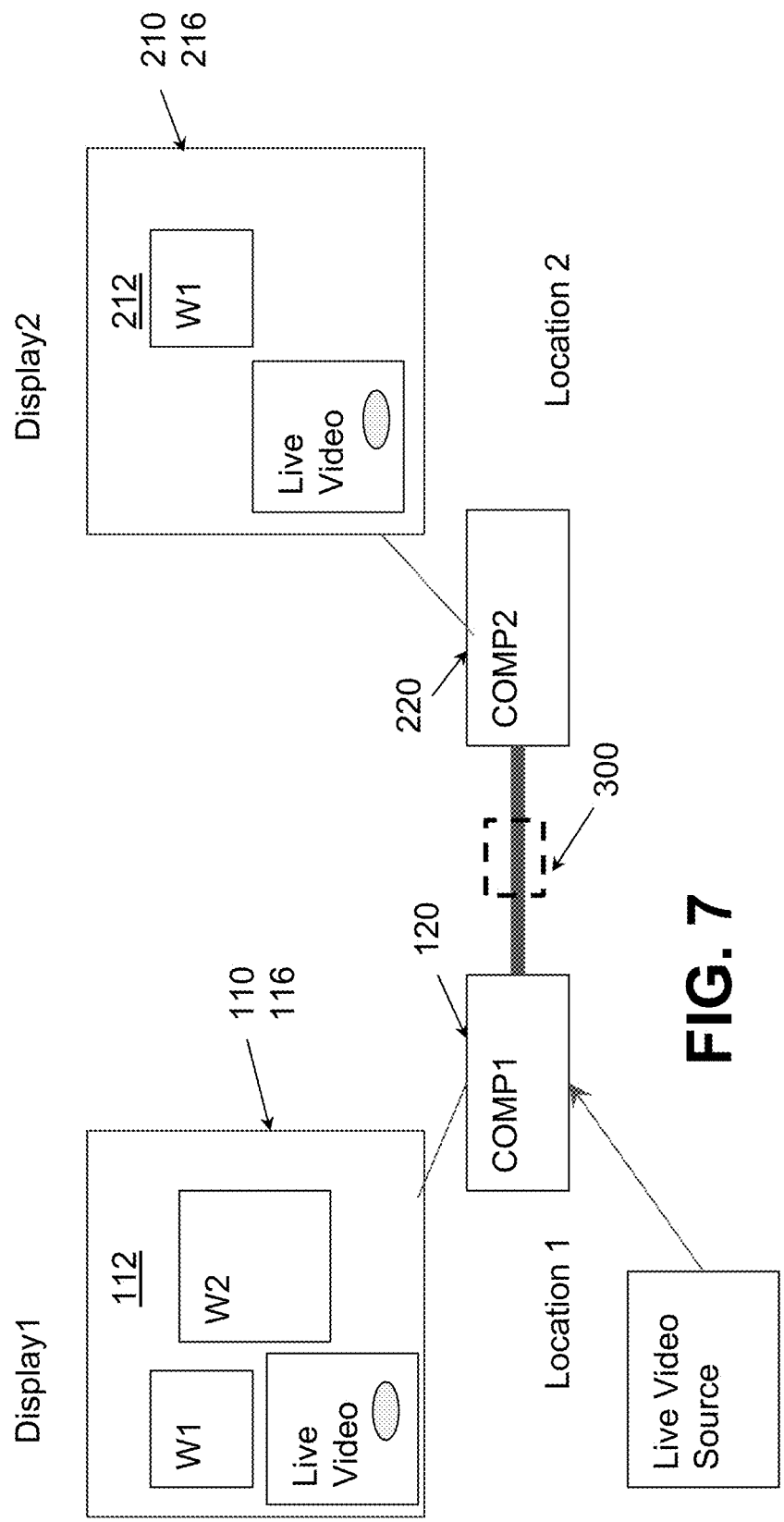

When the object is a live video window, data in the video window is streamed from a first location to the other multi-site locations, as shown in FIG. 6. This streaming may be through another relay server, while the relay server 300 may only transmit the virtual canvas, non-live objects and change information. This allows users in the various other locations to view the video in real time at the same time as the source location (i.e., real time video viewing with any inherent delay in the peer to peer connection). There is not a way to handle real time video viewing if the communication model is to store all objects in the cloud for a shared canvas, as the live video window is constantly changing. Further, users at either location may be annotating on the live video stream window, resizing and/or moving the live video stream, and so forth at the same time. For annotation, the annotation and drawing data is sent as separate layer from the video stream, e.g., the changes may be sent through the relay 300 and the video stream through another server. Only the change in the data for the annotation of drawing is communicated as described above, so that the annotations and drawing can be updated in real time at both locations, even on top of a live video stream, as shown in FIG. 7. The live video source could be a camera, computer, a mobile device, video conferencing feed, and so forth. Similarly, for resizing or moving live video windows, this data is also communicated separately from the real time video stream. Note that this could not be achieved in conventional web-based conferencing methods, which transmit the entire screen from one location to another one. For example, with web based video conferencing one location only has "control" and is the "host," so that only the host can control the video feed.

In this manner, if, for example, at a host location, i.e., the location from which the video as being streamed, there is a large screen that contains a number of objects, including windows that contain live video and other windows that contain static data, the information on the entire screen can be shared from the host location to the other locations, by streaming the live video windows only and sending data only for the static data windows.

Figure 8:
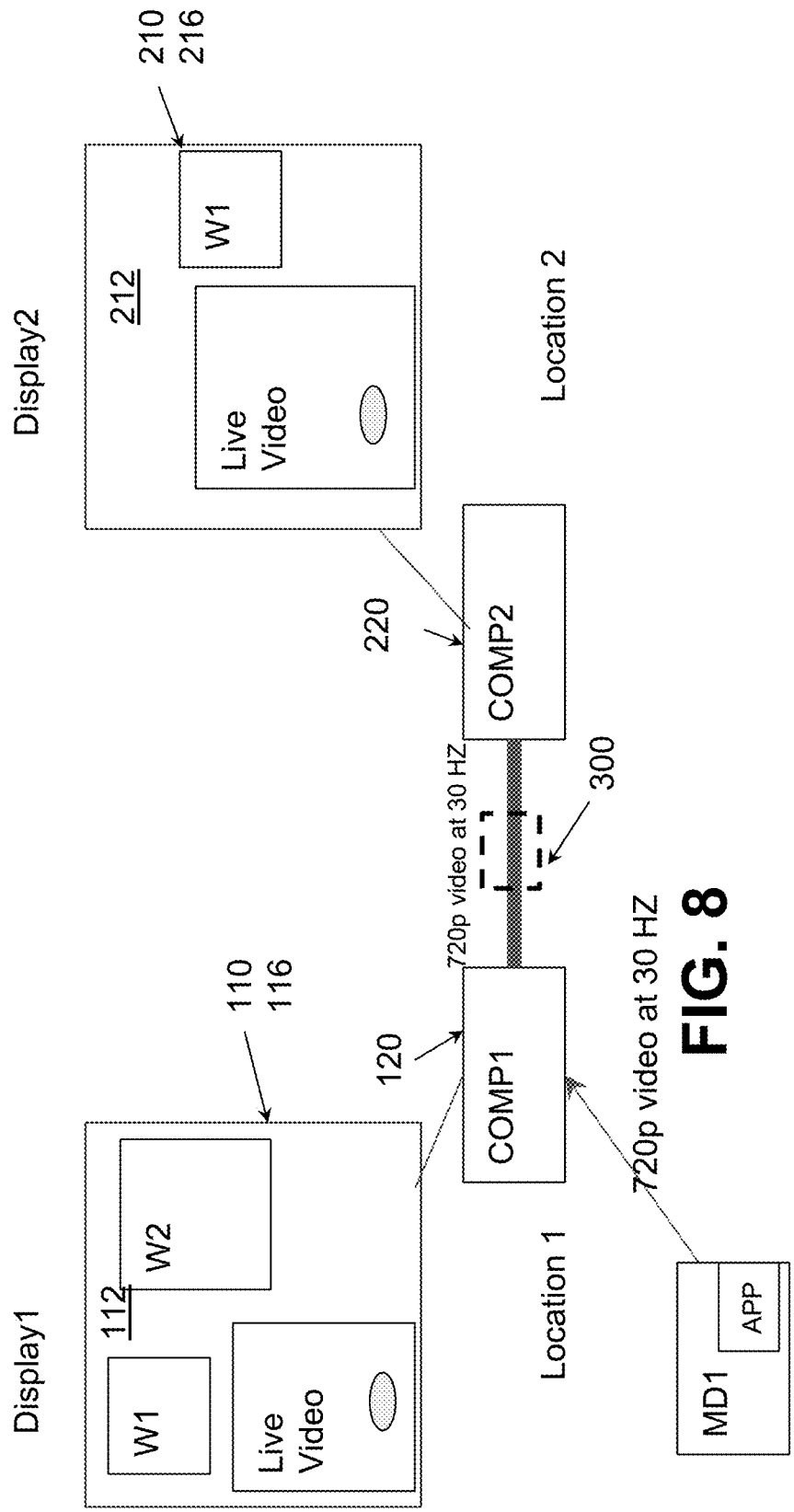

For further data reduction, windows sampling (Dynamic Resolution Scaling (DRS)) may be used as disclosed in U.S. patent application Ser. No. 15/056,787, filed Feb. 29, 2016, now U.S. Pat. No. 10,616,633, which is hereby incorporated by reference. When streaming live video widows in the manner disclosed above the bandwidth required can be much larger than with conventional web-based or video conferencing. For example, suppose at location 1 there are six video sources connected to COMP1. (These sources may be for example, web browsers, direct inputs from other computer sources, screen shares from other computers and/ or live windows generated from other applications on COMP 1). Each of these may be placed on the canvas and each may have a resolution of 1080p hd. Suppose that at location 1, DISPLAY1 has a resolution capable of displaying all six video sources simultaneously and the view of the canvas is such that all six video windows are displayed on DISPLAY1 at the same time in full 1080p HD. (That would mean that DISPLAY1 has resolution of at least 12 k). Normally, in web-based conferencing the source computer sends the entire resolution of the display because it has no information of how the content is being viewed on the receiving side. However, with ThinkHub® multi-site software, if at location 2, COMP2 has only a 4 k display, then, at most 4 k resolution would need to be transmitted. Suppose for example at location 2, the canvas is being zoomed in to a particular section of the canvas such that only 3 of the 6 videos are in view at a given time and these three videos are being displayed at 720p resolution. Then COMP2 can send data to COMP1 requesting that the three videos in view are sent at full frame rate but at a lower resolution (720p), as illustrated in FIG. 8. The three videos out of view can be sent at lower resolution and/or very low frame rate, for example 1 frame per 2 seconds. In this manner the total bandwidth can be reduced to lower than the size of the display at location 2. In this manner the bandwidth of the data transmitted can be reduced to the lower of (a) The resolution of the receiving display times the viewing frame rate;

(b) The combined resolution of all of the streaming video signals times the viewing frame rate; and (c) The combined resolution of all of the streaming video signals as displayed on the receiving display times the viewing frame rate.

The algorithm may be set to always lower the bandwidth to the lower of (b) and (c) above, which will mean that it will always be as low or lower than the lower of (a) and (b) above. Note that in the above analysis we neglected the bandwidth for the off-screen video signals, since they would be sent at such low frame rate that their bandwidth would be negligible.

In the method above, all the video sources send all info at full resolution to COMP1. Based on information received from the other computers in the multisite session on how the live video windows are being viewed thereon, COMP1 down samples the transmission to the other sites. In addition to this, COMP1 can also use this information to send info to the live video sources to downsample the video streams prior to sending the info to COMP1. In this situation a laptop would only send its full resolution signal if at least one computer in the multisite session was viewing that live signal and the laptop's full resolution or larger.

When the window having a video stream that is initially out of view, is then brought into view, something will still be shown in the window (e.g., the video at a very low frame rate) and then the computer COMP2 requests that the frame rate and bandwidth increase.

In another alternative, as shown in FIG. 8, when the mobile device is running the AirConnect™ application (APP), rather than the COMP1 performing the downsampling, the mobile device may perform the downsampling. This downsampling may be performed in accordance with a largest resolution on any Common Display in the multisite session (e.g. Display 1 and Display 2 in FIG. 8). Suppose a Mobile Devices is sending a first live video stream to the multisite session. This first live video stream may appear in a window on one or multiple Common Displays. All Common Displays in the multisite session may send the resolutions of each of the windows for the first live video stream in the multisite session to the mobile device outputting the first live video stream and that mobile device then determines the highest resolution needed (Max Needed Resolution). The mobile device MD1 then sends the first live video stream to one Common Display Computer in the multisite Session (COMP 1 in FIG. 8), e.g., the Common display computer at the location of the mobile device MD1 with the Max Needed Resolution. COMP 1 then sends the first live video stream with the Max Needed Resolution to its associated display computer. COMP1 may then send the first live video stream to all other Common Display Computers in the multisite Session. For example, Display2 may be displaying the first live video at the Max Needed Resolution and sends this resolution to the display computer COMP1, which sends it to the mobile device. The mobile device then downsamples the live video in accordance with the Max Needed Resolution and sends the live video stream to the display computer COMP1 to send to the other displays in the session.

Additionally, the entire canvas may also be stored in a cloud server as well as locally. Thus, all information on the canvas may be sent to the cloud server as well as the relay server 300. The relay server immediately sends any changes from the change host computer and change non-host and objects from the host computer to the non-host computer, the cloud server may be updated less frequently at a predetermined time.

Figure 9:
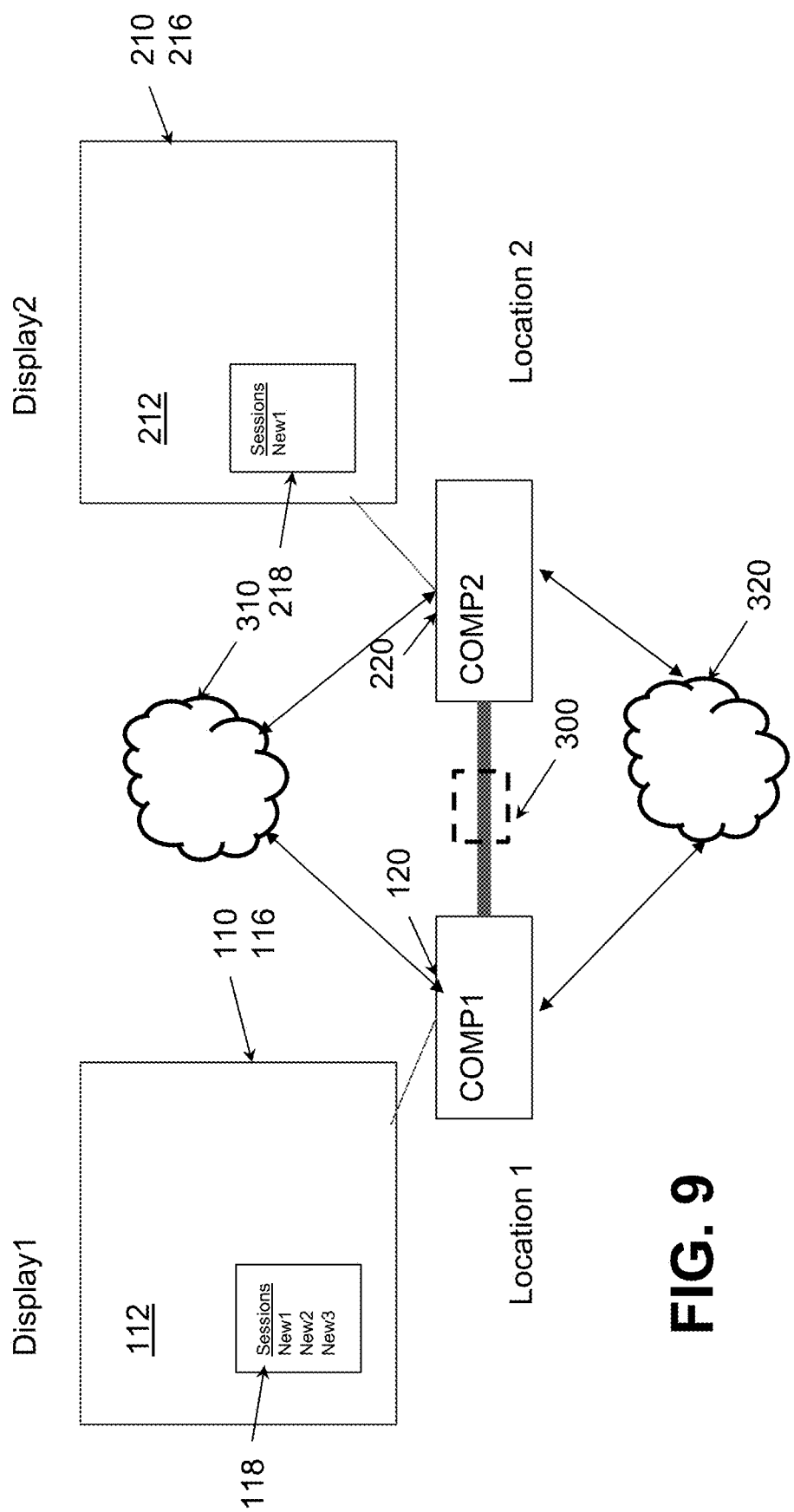
FIGS. 9 to 16 illustrate a display system in accordance with a second embodiment at different stages of operation.

While above embodiments disclose viewing a same canvas that can be individually controlled at different locations, sometimes it is desirable to synchronize what is being viewed at both locations within the window/object. Further, while above embodiments assume that the objects on the canvas are stored locally on the display computers COMP1 and COMP2, which may be associated with a large format display at respective locations, personal devices, e.g., laptop computers, desktop computers, smartphones, tablets, and so forth may serve as display computers COMP1 and COMP2 that may be integral with the display and/or may be connected with another display, that run a virtual canvas software, e.g., ThinkHub® Cloud software by TIV®, in which objects are stored in only the cloud, rather than locally, or may be stored both in the cloud and locally. This allows for real-time cloud-based collaboration in contrast to conventional cloud-based collaboration noted in the Background. For example, as shown in FIG. 9, while the relay server 300 handling sending the canvas and changes thereon may still be in the cloud as discussed above, a server 310, which may also be in the cloud, separate from the relay server 300 is now also used to store the canvas, position of objects on the canvas, canvas APP objects and changes to these are stored and transmitted to the non-host computer, other than the streaming objects from the host computer to the non-host computer and store this data on the canvas. Alternatively, the relay server 300 may be used only to stream live objects, with the server 310 both storing and transmitting the canvas. The canvas does not store the live stream, but would go back to the original source for the streaming object, e.g., a webcam, a hardline input, a stream from a screen share, or URL, i.e., the canvas is not storing the stream, just the location of the window on the canvas and the source of the stream. Thus, the canvas and objects thereon are not stored on the non-host computer, but are only accessible to the non-host computer while the non-host computer is participating in the canvas session. In other words, unlike previous embodiments, after the session concludes, the canvas including the canvas APP generated objects are stored on the server 310. There is no need to also store the canvas locally, as when a computer opens a canvas, it can retrieve the canvas information from the server 310 not locally. The canvas may not be stored even on the first computer that opened the canvas, after the session has ended. In particular, the objects generated within the canvas APP (native objects), e.g., notes, sketches, and so forth, are treated differently than streamed objects placed on the canvas, but not generated by the canvas APP.

When a first user starts a session, the canvas is stored both in the cloud and locally on the computer of the first user for use during the session. Once the session is ended, the canvas is typically not stored on the first computer, but is only accessible through the cloud. Then, when a second user signs into the session, in order to access the same canvas, the cloud server will send the canvas information to the computer of the second user. If a second user sends something to the canvas, other than a Live Stream Window (LSW), the cloud server stores this as part of the canvas and sends it to the first user. Similarly, if the second user makes a change on the canvas or within a window on the canvas, such changes may be updated with either of two methods: In a first method, the changes are sent to both a relay server and to a cloud server. With a second method, the changes are sent to the cloud server only. In the first method, the relay server may send the changes to the first computer, so that the first computer can update the information on the canvas. This allows the updates to take place quickly, as only the changes need to be communicated and only when a change is made by a computer in a session. The changes are also sent to the cloud server so that the cloud server can store an updated copy. Note that the changes are sent to the cloud server with both the first and second methods, so that the cloud server stores a master copy for both methods.

Note that for both methods, file-based objects are treated differently than LSWs. While file-based objects are treated differently with either the first method or the second method, with both methods, the content for LSWs is streamed through the relay server. Thus, while the location and size of each LSW is stored in the cloud with either the first method or the second method, the actual content of the LSW is streamed from the host computer to each non-host computer, typically through the relay server.

All of the features noted above may be used in the cloud version, i.e., where the master copy of file-based objects and other information for the canvas is stored on a cloud server. Any action taken on a host computer to make a change to the active canvas will be stored in the cloud in both the first and second methods. With the first method, the change is also relayed to the non-host computer.

Figure 10:
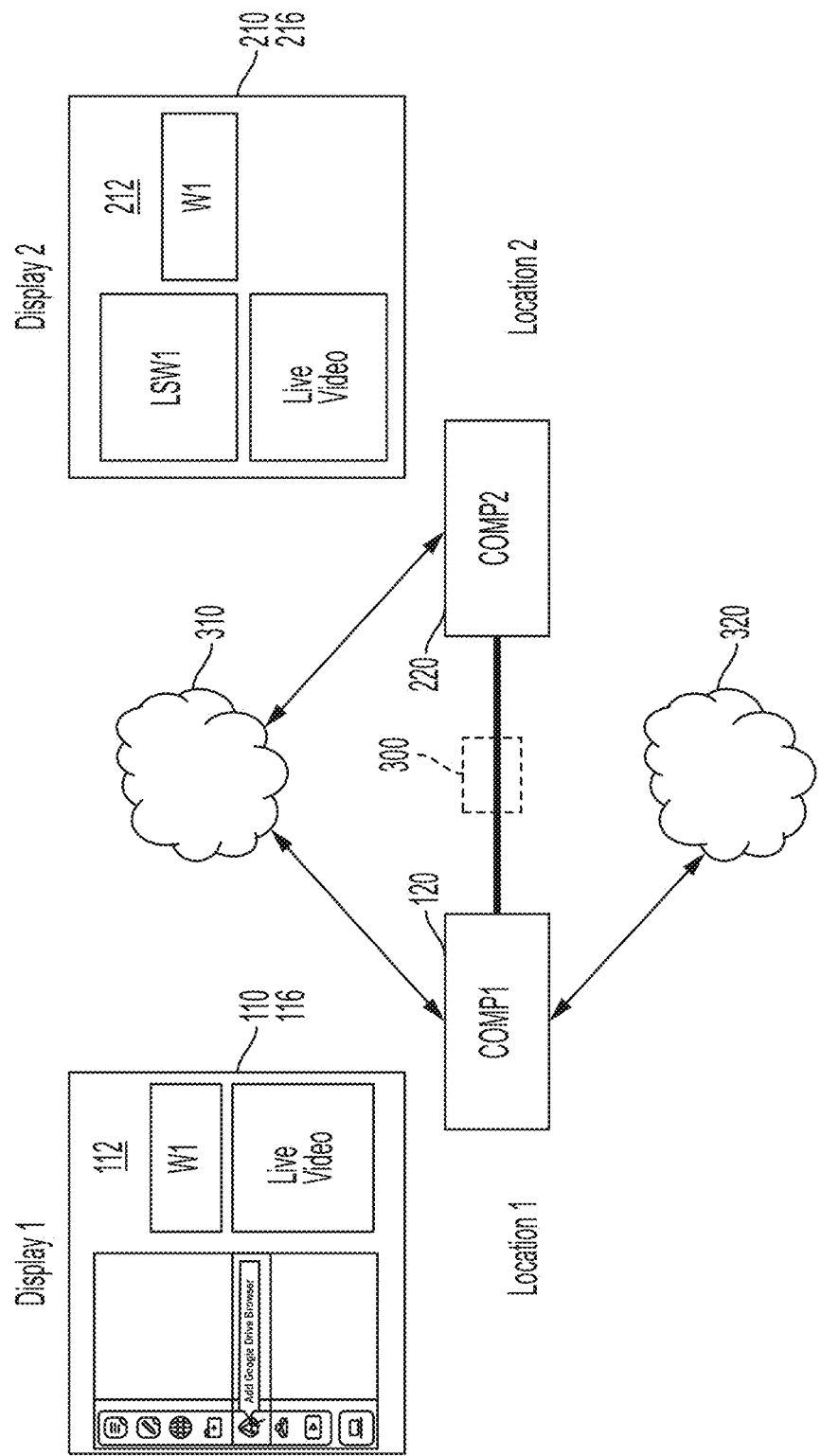
Figure 11:
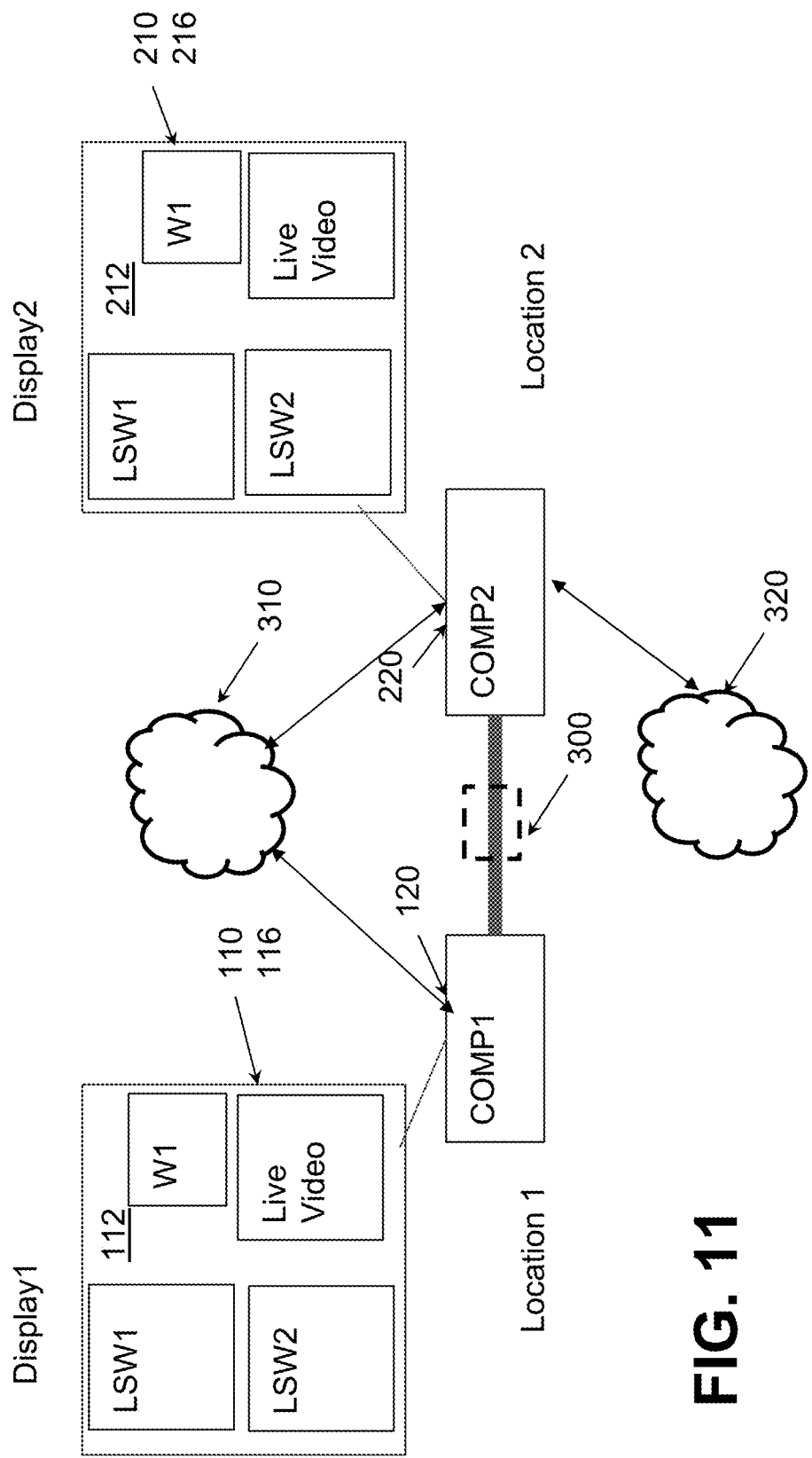

Dynamic content may be web browser, direct inputs from other computer sources, screen shares from other computers and/or live windows generated from other applications may be treated as an LSW. Further, any content that is not supported by a native application, such non-native content may be handled within an LSW. Examples of such non-native applications (applications that are not native to the canvas software) include, e.g., any Microsoft Office file, any Apple® files, CAD files, and so forth. Such dynamic content can be displayed in an LSW through the use of a menu in the canvas to access a web browser, a hardline input to a computer source, or a wireless stream from another computer. As shown in FIG. 10, when a user at location 1 opens a dynamic object, e.g., a browser window, to upload a live source object window (LSW1) to the canvas, this dynamic object is treated as a live video stream sent to the other location 2. For example, instead of the user at location 2 opening a browser application, the browser application is streamed to location 2. While the host computer of the browser application, e.g., the first computer COMP1 gets the web content from a web server 320, the non-host computer, e.g., the second computer COMP2 gets the stream of the web browser content directly from COMP1 or through the relay server 300, not from the web server 320. Thus, users at both locations will view the same portion on the LSW 1. Similarly, as shown in FIG. 11, a user at location 2 may open a live source window (LSW2), which will be treated in the same manner. In addition to the manipulation of the objects/windows, e.g., annotating, resizing, moving, and so forth, that may be performed on an object, when the objects are a LSW, the object itself may be edited by either user.

Figure 12:
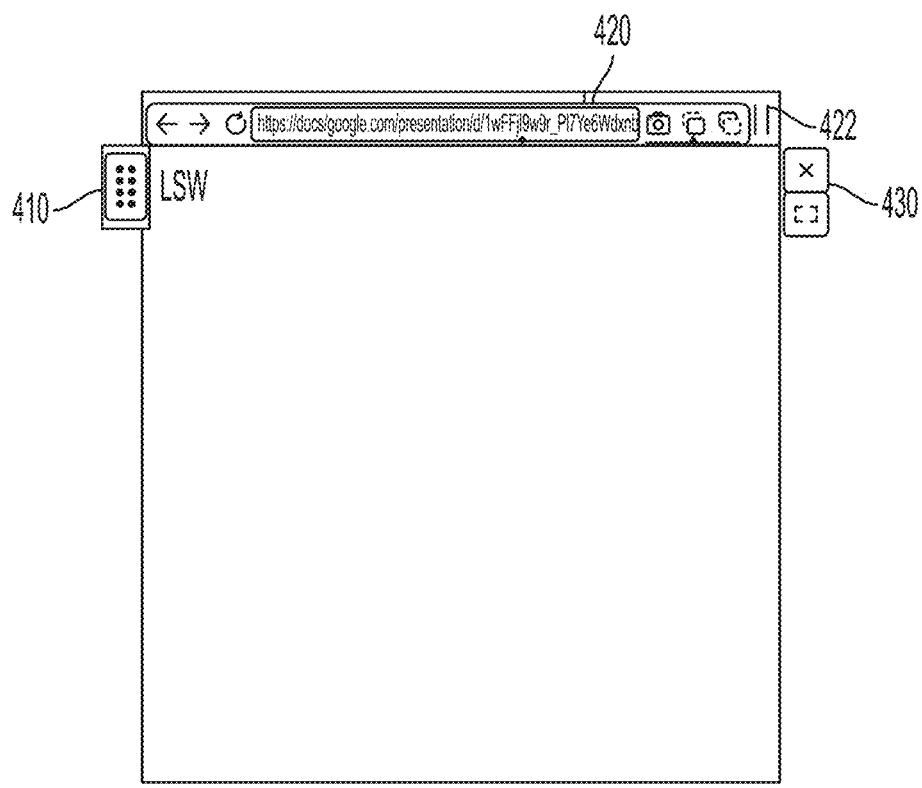
Figure 13:
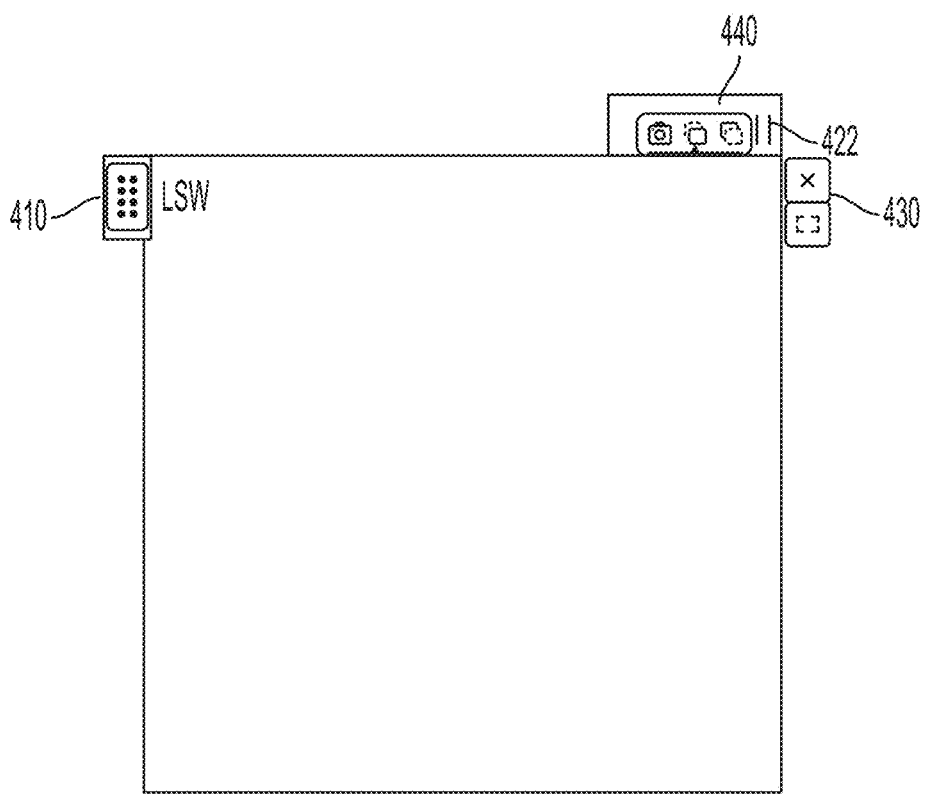

A detailed view of a live source window LSW for the host computer of the LSW is shown in FIG. 12, in which the LSW is for a browser including any browser based applications. In addition to the functions that may be applied to the canvas discussed above, functions directed to just the LSW may be adjacent to the LSW. These functions may similarly be provided on any type of window on the canvas as appropriate. For example, the LSW may include a handle 410 that allows for easier grabbing of the LSW, a menu 420 that may allow either user to control the backwards, forwards, and refresh of the LSW (only when the LSW is a browser), display an address of the content in the LSW (only when the LSW is a browser), bring the LSW forwards or backwards, take a snapshot of the LSW, and a pause button 4222 to pause the LSW, and a size menu 430 that allows the LSW to be closed or expand to full screen. As shown in FIG. 13, when the LSW is not for a browser, a menu 440 on the host computer for the LSW may only bring the LSW forwards or backwards, take a snapshot of the LSW, and a pause button 422 to pause the LSW.

If a user on a host computer of an LSW desires to interact with the content of the LSW, they would do so as normal. For example, suppose a first user is using COMP1 and COMP1 is a laptop computer and is the host computer of an LSW. If the LSW contains a web browser, a web version of Google Docs, or Office 365, then the user can interact within the LSW as they normally would with these documents/websites. Any mouse clicks, track pad movements, touches, key board presses would be sent to the websites/documents in the same manner as if they were opened directly on the computer, outside of the canvas, provided that the LSW is in the correct mode. (If, e.g., the LSW is in annotation mode, then gestures would provide annotation, instead of direct interaction with the content of the LSW.) If the LSW is a screen share of an entirety, an application window or one of multiple screens of the first user, then similarly the first user may interact with the application window (or windows) similar to as the user uses these programs outside of the canvas software. Any gesture performed on these windows can be relayed to the application by the canvas software. Similarly, if the LSW contains a hardline input (input from another computer or source through the use of a hardline cable, such as an hdmi cable) or a streaming input from another computer through a wireless connection, any gesture made on the LSW can be similarly relayed to the source of the LSW content. If a second user is using a second laptop computer, COMP2, and is in the same session as COMP1 and viewing the same part of the canvas that contains the LSW, there are several ways to allow the second user to interact with the contents of the LSW. A first method is to similarly relay the gestures from COMP2 to COMP1 and then COMP1 can relay the gestures to the source of the LSW just as described above. A second option is described below.

Figure 14:
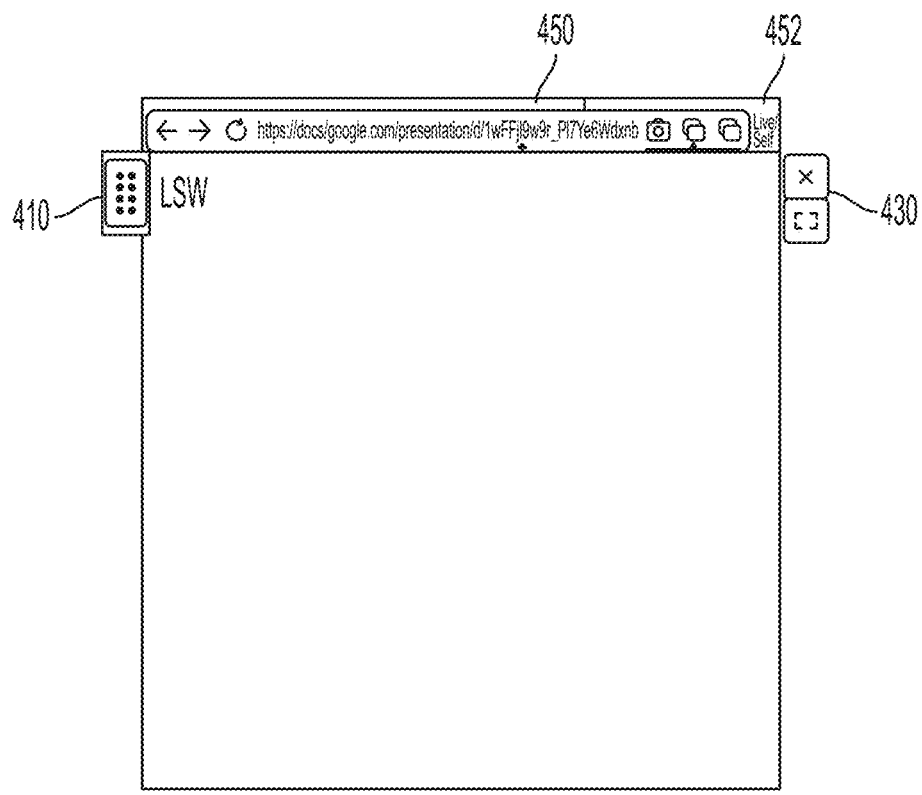

For web browsers: In the LSW window in FIG. 14 for any non-host computer of that LSW, there can be a menu 450 that includes a toggle switch 452 with two states: (1) Live View (synchronous) or (2) Self View (synchronous). For example, if there are 3 computers (Comp1, Comp2 and Comp3) in a session (or viewing a canvas at the same time) and Comp1 opens a web browser on the canvas, then Comp 1 may be the host computer, meaning that Comp1 would receive the content for the LSW from the web server. Comp2 and Comp3 would be non-host computers. Comp1, as a host computer would send streams of the LSW window to both Comp2 and Comp3. Computers Comp2 and Comp3 would each display the Live-Self View toggle switch, as they are they are both non-host computers for the LSW window. The LSW windows in the canvas on all three computers would then show the same information, provided that the states of both toggle switches are set to Live View. Suppose the user of computer Comp2 then sets the toggle switch in its LSW window to Self-View. In this case the LSW window on Comp2 would no longer display the stream from the host computer Comp1, either directly or through the relay server 300. Instead Comp2 would receive the information from the web server through the web server 320. In this case, the LSW on Comp2 may look different than the LSW on the other two computers. For example, if the user on Comp2 moves the location of the contents of the web browser, this may move only in the Comp2 LSW window and not in the other 2 LSW windows. If the Comp2 user then switches the toggle switch back to Live View, they would then see the stream from the host computer Comp1, rather than the information from the web server 320 and therefore have the view synchronized with the LSW window on the other two computers. If the LSW switched to Self-View is a web browser application, then changes made during the Self-View would be seen by others viewing the application. In contrast, if the LSW is not a web browser application, activity performed during the Self View would not typically be viewed by other computers or shown on the canvas.

Figure 15:
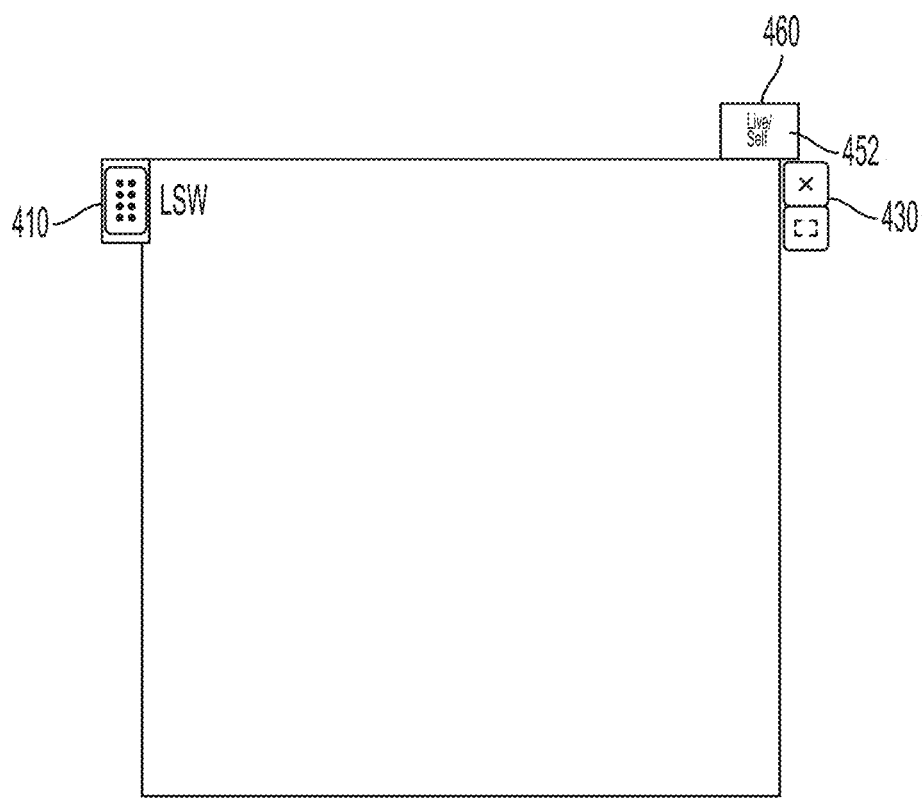

Suppose there are four computers in a session all viewing/editing the same canvas. And suppose there is a web browser open and Comp1 is the host of the web browser. Now, also suppose that the web browser is viewing a web document such as Office 365 or Google docs. In one embodiment the corresponding LSW windows for Comp2, Comp3 and Comp4 would all contain the Live/Own View toggle switch. In another embodiment, as shown in FIG. 15, a menu 460 for the LSW windows on Comp2, Comp3 and Comp4 would only contain the Live/Own View toggle switch 452, for those users do not have write access to the canvas, which may be granted by the host of the session. Everyone sees their own view Suppose further that the user of Comp1 ends their session. Any of the other three computers in the session may become the host computer for the LSW window, provided that the computer has access to the LSW source and the authentication credentials. This may require the users to enter their authentication credentials. This may also happen at the start of a new session.

When the pause on the menu 420 of the LSW is activated by the host computer, the user of the non-host computer will no longer have access to the live video stream of the LSW from the host computer. To work on the content in the LSW, the non-host user will need to open the browser application and have authorization to access the material in the LSW. This allows non-synchronized collaboration as needed, which will still be updated in the LSW on the canvas when the host computer restarts the LSW. When the pause on the menu 420 of the LSW is not activated, a user without access to the underlying content can edit and review the material in the LSW when in the canvas session with the host computer, but not otherwise.

Figure 16:
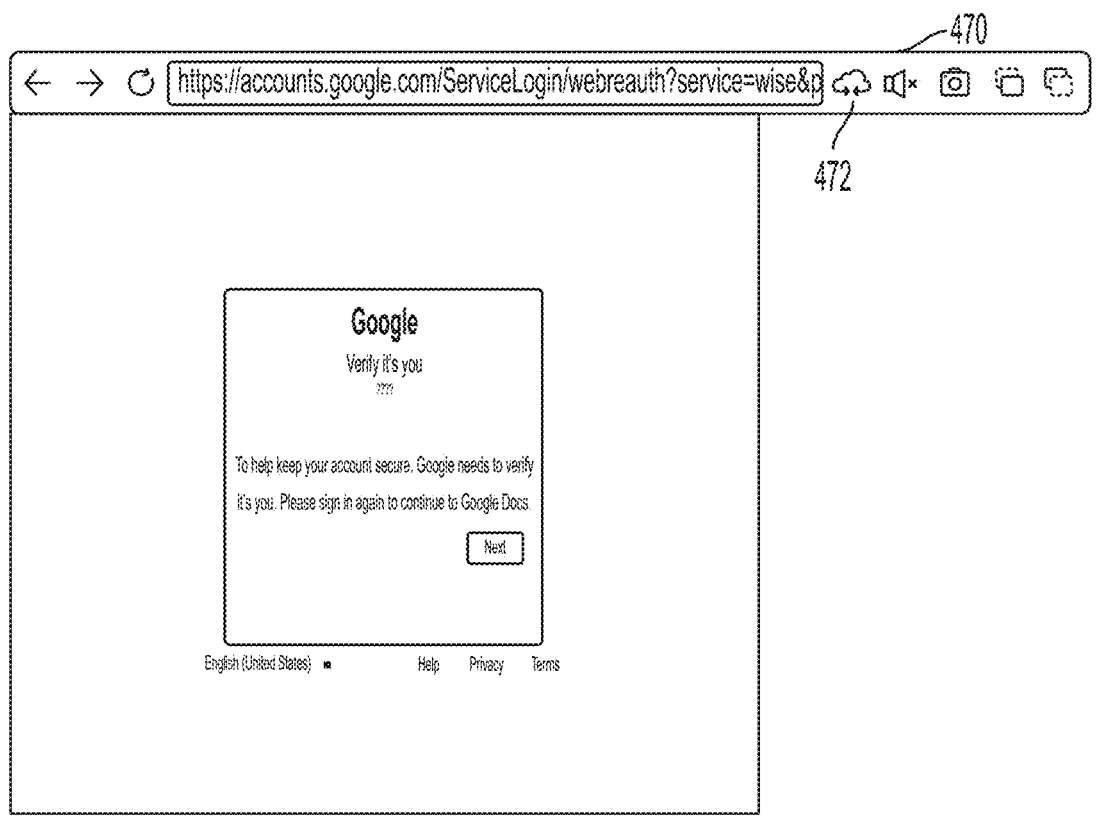

Additionally or alternatively, as shown in FIG. 16, when the LSW is a browser window, a menu 470 may include a cloud toggle which allows any computer to become the host of the LSW by selecting the cloud toggle. When selected, the cloud toggle 470 may be highlighted. For example, suppose there is a session with 4 computers: Comp1, Comp2, Comp3 and Comp4. A user may add an LSW window to the canvas. Initially, the cloud toggle may be deselected. The LSW would then typically look as it does in FIG. 16 on all 4 computers. Now suppose the user of Comp 1 selects the cloud toggle. The cloud toggle on Comp1 may now be highlighted. Once this happens, the computers Comp2, Comp3 and Comp4 would all have their cloud toggle deselected and each of these computers would receive a stream of the content form the LSW of Comp1 to be located in the LSW of Comp2, Comp3 and Comp4. Thus, the LSW for all four computers would look the same, except that the cloud toggle would not be highlighted on compute Comp2, Comp3 and Comp4. Next, suppose the user of Comp2 selects the cloud toggle. Then Comp2 would become the host of the LSW window. The Comp1 cloud toggle would be deflected and no longer highlighted. The Comp2 computer would send a stream of the contents of the LSW window to the other 3 computers. When used in conjunction with the menus for the web-browser LSW shown in FIGS. 12 and 14, when the cloud toggle is selected, the menu 470 may include the pause button of the menu 420 and, when the cloud toggle is not selected, the menu 470 may include the live/self button of the menu 450. The above description, is based on the assumption that there is one host computer in the session at all times, and the other three non-host computers are all in Live View mode.

The LSW may be a window for any live source content, i.e., dynamic content outside the T1V app, e.g., screen share, camera feed, web browser, and the like. The synchronization ensures that when an object is viewed, all users are viewing the same portion of the object. In contrast, files that are generated by the T1V app, e.g., a note, a sketch, an image file, etc., are only editable within the canvas.

There are differences between how a LSW is treated once the sessions ends, i.e., no one is in the canvas and later people try to access the canvas.

a. Web Browsers. When the canvas is opened, someone in the session needs to be the host. This person needs to have access.
  b. Screen shares. Typically when the session ends, these will be deleted.
  c. Hardline inputs. To view these, will need to have a computer in the session that has access to the hardline inputs.
  d. Applications on a computer. The computer with the applications needs to be in the session.
  e. Video files. The file can be stored in the canvas in the cloud. If that is the case, then the host of the video file is not needed in the session. One issue with this is for large video files, the time to transfer it to the cloud, so may prefer not to be able to access this once the session has ended.

For any of the above LSW windows, one option is for the host computer to stream one stream to a cloud relay stream server. For example, if there is a session with 100 computers, it may place a significant amount of resource requirements on the host computer, if it were to provide 100 streams to 100 different computers. The use of a cloud relay stream server can lessen these requirements. The relay stream server may be located in the cloud and receive the one stream of a LSW from the host computer and then stream the contents of the LSW to the other computers in the session. If the number of streams needed are too large for the stream server to handle, the total number of computers could be divided into sections, each handled by a different local relay stream server. The primary stream server could then send the streams the local relay stream servers, and each local relay server could send the streams to the computers located in their section.

Alternatively, the stream servers could be located on each computer running a canvas APP, e.g., ThinkHub® Cloud or ThinkHub® multisite. Suppose there are one hundred different computers all viewing the same Canvas. It may be too large of a burden on the host computer to provide streams for all of the computers in the session. However, a relay stream server could be incorporated as an application in to one computer and with a limit of a fixed number of streams that it would support, e.g., three streams. Then the host computer could then, through the relay stream server application, stream the LSW to three other computers in a session. Each of the other computers could then similarly stream the LSW window to three other computers, and so on, until all computers in the session receive an LSW stream.

By way of summation and review, real time collaboration over multiple locations may be realized by establishing a shared canvas between computers at different locations, sending all objects on the canvas between these computers to be stored locally and/or to the cloud to be stored in the cloud. When the object is a native object, this native object may be stored at the non-host computers, and/or in the cloud. When the object is not a native object or is a live source object, these may be directly streamed to the non-host computers. This, only metadata, rather than the objects themselves, may be stored on the canvas. As used herein, a host computer is to mean the computer on which the data is originally stored or received, the computer on which the stream originates, or the computer on which a change is made, e.g., a host change computer. Thus, each computer may be both a host computer and a non-host computer in any given session.

Embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of this disclosure.

The methods and processes described herein may be performed by code or instructions to be executed by a computer, processor, manager, or controller. Because the algorithms that form the basis of the methods (or operations of the computer, processor, or controller) are described in detail, the code or instructions for implementing the operations of the method embodiments may transform the computer, processor, or controller into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, or controller which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A method of collaborating between a first computer associated with a first display at a first location and a second computer associated with a second display at a second location, the method comprising:
    establishing a connection between the first and second computers;
    starting a virtual canvas on the first computer;
        sending the virtual canvas from the first computer to the second computer;
        wherein either the first computer or the second computer may be a host computer for a file-based object on the canvas, sending the file-based object between a host computer and a non-host computer so that the file-based object is located on the same location on the canvas for the first and second computers; and
        wherein either the first computer or the second computer may be a host computer for a live source on the virtual canvas, streaming a live source object between a host computer running the live source object and a non-host computer by
            creating a live source window for the live source object within the virtual canvas on the host computer,
            sending the metadata information for the live source window to the non-host computer so that the live source window is at the same location on the virtual canvas for the first and second computers, and
            streaming the live source object to the live source window from the host computer to the non-host computer.

2. The method as claimed in claim 1, wherein establishing the connection and sending the metadata information are through a first server and streaming the live source object is through a second server.

3. The method as claimed in claim 1, wherein a first server is to store the file-based objects in the cloud and a second server is to stream the live source object.

4. The method as claimed in claim 3, wherein a third computer also receives the canvas information and the host computer for the live source window sends one stream of the content of the live source window to the second server and the second server sends two streams, one for each of the other two computers.

5. The method as claimed in claim 3, further comprising relaying changes in the windows/objects by a third server between a host change computer and a non-host change computer.

6. The method as claimed in claim 3, wherein the second server is a relay server.

7. The method as claimed in claim 3, where the first server and the second server are physically located on the same computer.

8. The method as claimed in claim 3, wherein the virtual canvas is stored in the first server.

9. The method as claimed in claim 3, wherein the first server is a relay server.

10. The method as claimed in claim 3, wherein the first server is a relay server and further comprising a third server that stores the virtual canvas.

11. The method as claimed in claim 3, wherein at least one of the first server and the second server is in the cloud.

12. The method as claimed in claim 3, wherein, when the live object is a browser application, the host computer receives the browser application from a third server and streams the browser application to the non-host computer through the second server.

13. The method as claimed in claim 3, further comprising
    sending data regarding a change in the canvas from a change host computer to a change non-host computer includes
    sending data associated with the change to the virtual canvas from the change host computer to change non-host computer.

14. The method as claimed in claim 13, further comprising storing the change in the first server.

15. The method as claimed in claim 1, wherein, when the first computer or the second computer exits the virtual canvas, the first computer or the second computer cannot view the virtual canvas.

16. The method as claimed in claim 1, wherein a view within the live source window on the virtual canvas is synchronized between the host and non-host computers.

17. The method in claim 1, where one of the two computers is a host computer for a file-based object and the other computer is a host computer for the live source.

18. The method in claim 1, where a user of the non-host computer for the live source can interact with the content in the live source window and those interactions are sent back to the host computer to make changes to the content in the live source window on both computers.

19. The method of claim 1, wherein the non-host computer viewing the live source window includes a switch associated with the live source window, the switch switching between a synchronous view of the live source window and an asynchronous view of the live source window.

20. A non-transitory computer readable storage device having computer readable instructions that when executed by circuitry cause the circuitry to:
    establish a connection between the first and second computers;
    start a virtual canvas on the first computer;
        send the virtual canvas from the first computer to the second computer;
        wherein either the first computer or the second computer may be a host computer for a file-based object on the canvas, sending the file-based object between a host computer and a non-host computer so that the file-based object is located on the same location on the canvas for the first and second computers; and wherein either the first computer or the second computer may be a host computer for a live source on the virtual canvas, stream a live source object between a host computer running the live source object and a non-host computer by
- creating a live source window for the live source object within the virtual canvas on the host computer,
- sending the metadata information for the live source window to the non-host computer so that the live source window is at the same location on the virtual canvas for the first and second computers, and
- streaming the live source object to the live source window from the host computer to the non-host computer.

\* \* \* \* \*